Oct. 20, 1931.  P. A. KOURTZMAN  1,827,990
LOCKING DEVICE FOR SPEEDOMETERS FOR VEHICLES
Original Filed Jan. 31, 1929    2 Sheets-Sheet 1
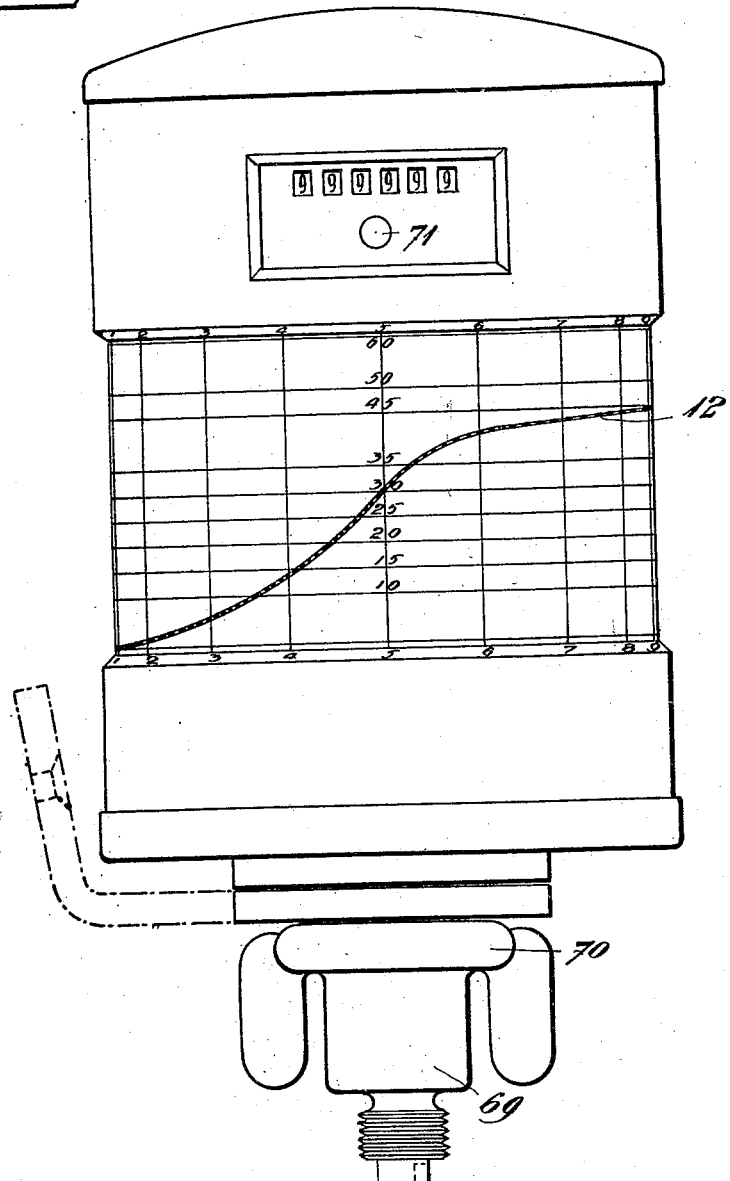

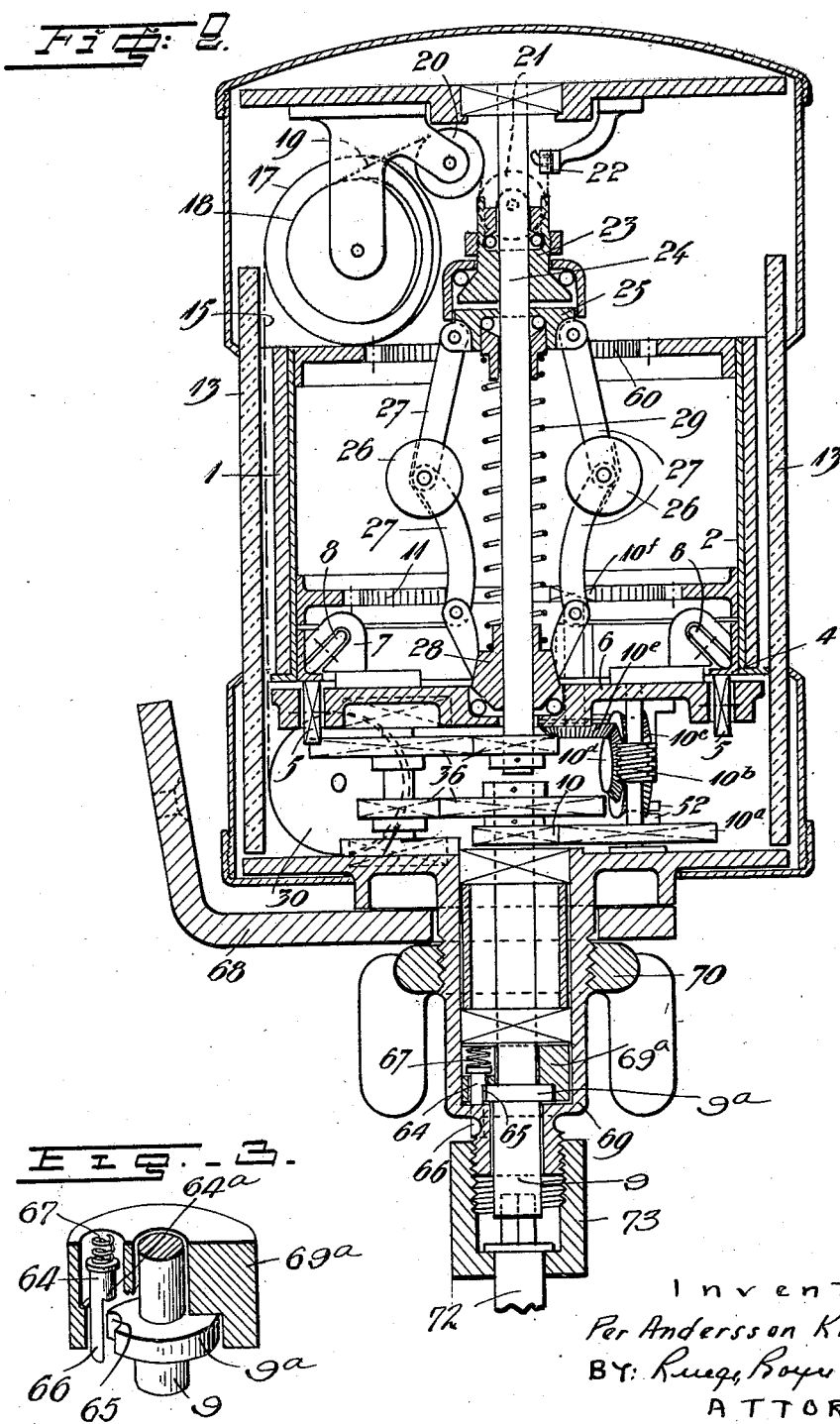

Patented Oct. 20, 1931

1,827,990

UNITED STATES PATENT OFFICE

PER ANDERSSON KOURTZMAN, OF VARTAN, SWEDEN

LOCKING DEVICE FOR SPEEDOMETERS FOR VEHICLES

Original application filed January 31, 1929, Serial No. 336,364, and in Sweden February 8, 1928. Divided and this application filed April 1, 1930. Serial No. 440,831.

The present invention relates to a locking device for speedometers for vehicles, which speedometers have a shaft which can be connected by means of a clutch member to a driving device. The characteristics of the invention consist in the fact that associated with said shaft there is a groove for a bolt slidable in a stationary part of the apparatus, which bolt, when the apparatus is disconnected from its driving device, through the action of a spring is kept in the groove and locks the shaft, but which by the clutch member is forced out of engagement with the groove, thus leaving the shaft free to rotate.

This application is a division of applicant's co-pending application, serial No. 336,364, filed January 31st, 1929.

In the accompanying drawings there is shown, by way of example only, a locking device applied to a speedometer having a diagram cylinder provided with a diagram cord. Fig. 1 shows the apparatus in elevation. Fig. 2 shows the same in vertical section; and Fig. 3 is an enlarged sectional view showing a detail of the locking device.

Referring to the drawings, 1, 2 is the diagram cylinder, which rotates on rollers 5 journalled in a stationary disc 6 supporting bearings 7 for rollers 8, which rest against the inner corner of a ring 4 fixed to the cylinder. The rotary motion of the cylinder 1, 2 is transmitted from the running wheels of the vehicle by means of a flexible shaft, a portion of which is indicated at 72, said flexible shaft being connected up to a shaft 9, from which motion is imparted through the agency of gears 10, $10^a$, $10^b$, $10^c$, $10^d$, $10^e$, $10^f$ and a cogged ring 11, to the cylinder. The diagram cord is designated 12 and is kept lightly pressed between the cylinder 1, 2 and a fixed, transparent wall 13. The reference characters 21, 23, 24, 25, 26, 27, 28, 29 designate a centrifugal device which is fully described in my allowed application, serial No. 440,829, and which device serves to operate cables 19, one end of each of which is secured to a stationary bracket 22, the cables running thence over rollers 20 and being secured at their opposite ends to pulleys 18. The pulleys 18 are attached to a running wheel 17, on which lies and to which is attached one end of a band 15, the other end of which lies on, and is attached to, a spring-drum 30. The band 15 is pulled in one direction by the centrifugal device and in the opposite direction by the spring-drum 30 and is provided with a carrier (not shown), which carries along the diagram cord for forming the speed diagram. A gear 36 transmits rotary motion to the centrifugal device from the shaft 9. An ordinary jaw-clutch 52 (only indicated in Fig. 2) enables the apparatus to stand still on backing. 60 is a cogged ring, from which motion is transmitted to a counting mechanism (not shown). An opening 71 is provided in the housing of the apparatus through which a signaling device may be observed, as described in my co-pending allowed application serial No. 440,830.

The device for automatically locking the apparatus when it is disconnected from the driving shaft on the vehicle comprises a bolt 64 housed in a spacing sleeve $69^a$ which encircles the shaft 9, said bolt being mounted for sliding movement in parallel relation to the shaft. The bolt is provided with a laterally extending enlargement $64^a$ and is normally under the pressure of a coil spring 67 which urges the bolt forward and causes said enlargement to enter a groove or recess 65 in the periphery of a collar $9^a$ formed on the shaft 9. With the bolt thus engaging the collar it will be evident that the shaft 9 will be locked against rotation. However, the end 66 of the bolt projects outside of the apparatus and into the path of a swiveled connecting member 73 carried by a flexible shaft 72 and which connecting member is interiorly threaded for engagement with the threaded lower end of the sleeve 69 thereby to retain the flexible shaft 72 in operative engagement with shaft 9. In Fig. 2 the bolt is shown in its lowermost position thus locking the shaft 9 against rotation, and the connecting member 73 is out of contact with the end 66 of the bolt. With the parts in this position it will readily be seen that upon further screwing up the connecting member 73 on the sleeve 69, the said connecting member will engage the end of the bolt and cause it to move upward against the tension of the spring 67, thus carrying the enlarged portion of the bolt out of engagement with the groove 65 in the collar 9ª and leaving the shaft 9 free to rotate with the flexible shaft 72.

The apparatus is journalled on a base plate 68, which can be fixed to some suitable place, and has a sleeve-shaped part 69 projecting through the plate 68, and also a nut 70 screwed upon part 69 under the base plate, so that the apparatus can be turned into any suitable position and then locked by means of the nut 70 in this position.

The separate parts of the apparatus shown may of course be varied in many ways, provided only the characteristics of the invention are retained. The apparatus can be used on many different kinds of vehicles, e. g. motor cars, locomotives, etc.

What I claim is:

1. In a speedometer, the combination of a shaft mounted for rotation and provided with a collar having an axially extending peripheral groove, a tubular stationary member encircling said shaft and having an exteriorly threaded sleeve portion forming a coupling connection for the shaft, a spring-pressed bolt slidable axially in said tubular member and having an offset portion normally in engagement with said groove thereby to retain the shaft against rotation, the threaded portion of said sleeve having an axially extending groove for the reception of one end of the bolt when in shaft-retaining position, and a coupling member threaded on said sleeve connection and adapted to move said bolt against the tension of its spring thereby to carry said offset portion out of engagement with the collar groove.

2. In a speedometer, the combination of a stationary supporting plate, a tubular member mounted in said plate for angular movement relatively thereto, means for securing said member against movement, a shaft rotatable in the tubular member, and provided with a collar having an axially extending peripherally open groove, said tubular member having an exteriorly threaded sleeve portion forming a coupling connection for the shaft, a spring-pressed bolt slidable axially in said tubular member and having an offset portion normally in engagement with said groove thereby to retain the shaft against rotation, and a companion coupling is threaded on said sleeve and adapted to move the bolt against the tension of its spring thereby to carry said offset portion out of engagement with the groove.

In testimony whereof I have signed my name to this specification.

PER ANDERSSON KOURTZMAN.